US012427853B2

(12) United States Patent
Scopesi et al.

(10) Patent No.: US 12,427,853 B2
(45) Date of Patent: Sep. 30, 2025

(54) COOLING SYSTEM FOR A POWER TAKE-OFF AND TRANSMISSION ASSEMBLY FOR A VEHICLE COMPRISING THE COOLING SYSTEM

(71) Applicant: DANA ITALIA S.R.L., Arco (IT)

(72) Inventors: Marco Scopesi, Arco (IT); Luca Gambini, Arco (IT); Andrea Bortoli, Arco (IT); Davide Deimichei, Arco (IT); Fabrizio Denei, Arco (IT)

(73) Assignee: DANA ITALIA S.R.L., Arco (IT)

( * ) Notice: Subject to any disclaimer, the term of this patent is extended or adjusted under 35 U.S.C. 154(b) by 399 days.

(21) Appl. No.: 18/186,690

(22) Filed: Mar. 20, 2023

(65) Prior Publication Data

US 2023/0294507 A1  Sep. 21, 2023

(30) Foreign Application Priority Data

Mar. 21, 2022 (DE) ..................... 10 2022 202 767.1

(51) Int. Cl.
*B60K 17/28* (2006.01)
*B60K 11/04* (2006.01)

(52) U.S. Cl.
CPC ............. *B60K 11/04* (2013.01); *B60K 17/28* (2013.01)

(58) Field of Classification Search
CPC .............................. B60K 11/04; B60K 17/28
See application file for complete search history.

(56) References Cited

U.S. PATENT DOCUMENTS

| 8,912,698 B2 * | 12/2014 | Fleming | ................ | H02K 9/227 |
| | | | | 310/89 |
| 2007/0209457 A1 * | 9/2007 | Irikura | .................. | B60K 17/28 |
| | | | | 74/15.8 |

\* cited by examiner

*Primary Examiner* — Bryan A Evans
(74) *Attorney, Agent, or Firm* — McCoy Russell LLP

(57) ABSTRACT

A cooling system for a power take-off is proposed. The cooling system comprises a housing including a first chamber for at least partially accommodating a power take-off and a second chamber for at least partially accommodating an axle assembly including an axle shaft, and at least one passive heat conducting element arranged between the first chamber and the second chamber, the at least one passive heat conducting element being configured to provide thermal communication between the first chamber and the second chamber. Furthermore, a transmission assembly for a vehicle is proposed, the transmission assembly comprising the cooling system.

19 Claims, 4 Drawing Sheets

COOLING SYSTEM FOR A POWER TAKE-OFF AND TRANSMISSION ASSEMBLY FOR A VEHICLE COMPRISING THE COOLING SYSTEM

CROSS-REFERENCE TO RELATED APPLICATION

The present application claim priority to German Patent Application No. 10 2022 202 767.1, entitled "COOLING SYSTEM FOR A POWER TAKE-OFF AND TRANSMISSION ASSEMBLY FOR A VEHICLE COMPRISING THE COOLING SYSTEM", filed Mar. 21, 2022. The entire contents of the above-listed application is hereby incorporated by reference for all purposes.

TECHNICAL FIELD

The present disclosure relates to a cooling system for a power take-off (PTO) and a transmission assembly for a vehicle comprising the cooling system. For example, the present disclosure relates to a cooling system for a tractor PTO. However, cooling systems of the presently proposed type may be used in but are not limited to other vehicles having a PTO such as wheel loaders, dumpers, tippers, excavators, trucks, fork-lift trucks, harvesters, or the like. The proposed cooling system facilitates passive cooling of a PTO.

BACKGROUND AND SUMMARY

Some operating conditions of a vehicle PTO require full vehicle power when the vehicle itself is stationary. This condition can be critical for heat dissipation from the PTO, especially in configurations where the PTO is arranged adjacent to the axle but is not in fluid communication with the associated cooling circuit. However, in case the heat cannot be dissipated to a sufficient degree, the PTO is not able to properly function in all operating conditions.

Although additional cooling of the PTO can be provided by connecting it to an existing active cooling system of the vehicle, this leads to considerable installation work, additional installation space requirements, increased system complexity, increased maintenance requirements, an overall cost increase and/or significant losses in the overall efficiency of the existing cooling system.

Therefore, the present disclosure addresses the problem of facilitating the cooling of a PTO without increasing the system complexity, size and system costs.

This object is solved by a cooling system and a transmission assembly for a vehicle comprising the cooling system according to the independent claims. Special embodiments and further developments are the subject of the dependent claims and the following description.

The proposed cooling system for a PTO comprises a housing including a first chamber for at least partially accommodating a power take-off and a second chamber for at least partially accommodating an axle assembly including an axle shaft, and at least one passive heat conducting element arranged between the first chamber and the second chamber, the at least one passive heat conducting element being configured to provide thermal communication between the first chamber and the second chamber.

In that a passive heat conducting element is provided between the first and second chambers, thermal communication between the first and the second chambers is substantially improved, thereby—depending on the operating conditions—facilitating heat dissipation from a PTO, such as for operation conditions where the axle itself is standing still while the PTO requires full power. As the arrangement of the first and second chambers with the passive heat conducting element is completely passive, the overall complexity of the system is not significantly increased, while the overall costs remain limited. For instance, the proposed cooling system does not require any maintenance and does not require any external power to work.

Passive cooling—as opposed to active cooling—or heat conduction in general is understood to be a mechanism that does not involve any active components, such as pumps or fans, and therefore does not consume any energy. In other words, passive cooling is only realized through natural convection and heat radiation.

The first chamber may be located adjacent to the second chamber. The first chamber and the second chamber may be separated by a wall portion of the housing. The wall portion may be arranged between the first chamber and the second chamber. Consequently, the at least one passive heat conducting element may be configured to provide thermal communication between the first chamber and the second chamber in addition to the wall portion separating the first chamber from the second chamber.

The first chamber and the second chamber may be filled or at least partially filled with a cooling liquid. The first chamber and the second chamber may be fluidically isolated from each other. That is, any cooling liquid contained and/or circulating in the second chamber may be separated and isolated from any cooling liquid contained and/or circulating in the first chamber. A wall portion of the housing separating the first chamber from the second chamber may fluidically separate the first chamber from the second chamber. The cooling liquid may comprise oil, for example cooling and/or lubricating oil. The first chamber and the cooling liquid contained in the first chamber may define a closed thermodynamic system. In other words, the first chamber and the cooling liquid contained in the first chamber may be configured to provide only energy or heat exchange without any material exchange with the exterior. Consequently, the cooling liquid contained in the first chamber may form a fixed non-replaceable quantity in the operating state.

According to an embodiment of the present disclosure, the cooling system may additionally include a cooling circuit comprising the second chamber and the cooling liquid contained in the second chamber. This means, the second chamber at least partially accommodating the axle assembly may be connected or connectable to a cooling circuit of the vehicle, the engine cooling circuit, for example. The cooling circuit may further comprise a heat exchanger and a liquid pump for circulating the cooling liquid between the second chamber and the heat exchanger. In other words, the cooling circuit may provide active cooling of the second chamber. At the same time, the cooling of the first chamber may remain exclusively passive.

The at least one passive heat conducting element may comprise a heat conducting body at least partially disposed in the first chamber and attached to or at least partially forming a wall portion separating or fluidically separating the first chamber from the second chamber. Additionally or alternatively, the at least one passive heat conducing element may comprise a heat conducting body at least partially disposed in the second chamber and attached to or at least partially forming a wall portion separating or fluidically separating the first chamber from the second chamber. The heat conducting body may be sealingly attached to the wall portion. The aforementioned arrangements of heat conducting body and first and/or second chamber may allow a simple equipment of a PTO with the proposed cooling system.

The heat conducting body may at least partially extend into the first chamber and/or into the second chamber. The heat conducting body may comprise a plurality of fins or ribs extending into the first chamber and/or into the second chamber. For example, the heat conducting body may comprise a first set of fins or ribs extending into the first chamber and a second set of fins or ribs extending into the second chamber. The fins or ribs may provide a better heat transfer. The heat conducting body may comprise a plate portion attached to or at least partially forming a wall portion separating or fluidically separating the first chamber from the second chamber. The heat conducting body may at least partially extend through a wall portion separating or fluidically separating the first chamber from the second chamber. Alternatively, the passive heat conducting element may be attached to a continuous wall portion separating or fluidically separating the first chamber from the second chamber. This may allow the cooling system to be retrofitted in an existing housing in a simple way. For example, the heat conducting body may comprise a first heat conducting body member attached to the continuous wall portion inside the first chamber and a second heat conducting body member attached to the continuous wall portion inside the second chamber. The first heat conducting body member and the second heat conducting body member may be arranged opposite and overlapping each other.

The at least one passive heat conducting element may be made of or comprise copper and/or aluminium. The at least one passive heat conducting element may be made of or comprise a material having a thermal conductivity of at least 30 W/(m·K), of at least 100 W/(m·K), or of at least 180 W/(m·K). The at least one passive heat conducting element may be made of a different material than the housing. For example, the housing may be made of cast iron. For instance, the at least one passive heat conducting element may have a higher thermal conductivity than the housing.

Using a different material and/or different geometry of the at least one passive heat conducting element with respect to a simple, for example cast iron, wall, enables a vastly improved heat dissipation.

Furthermore, the present disclosure relates to a transmission assembly for a vehicle, the transmission assembly comprising the proposed cooling system, a PTO at least partially arranged in the first chamber and an axle assembly including an axle shaft, wherein the axle assembly is at least partially arranged in the second chamber.

The PTO may be drivingly engaged or configured to be drivingly engaged with a first drive shaft and the axle shaft may be drivingly engaged or configured to be drivingly engaged with a second drive shaft. That is, the axle shaft and the PTO may operate independently. The axle shaft and/or the first drive shaft and/or the second drive shaft may be partially accommodated in the second chamber. The axle assembly may comprise an axle differential connecting the second drive shaft to the axle shaft, for example to two axle half-shafts of the axle shaft. The axle differential may be at least partially accommodated in the second chamber. The axle shaft may be provided for front or rear wheels of the vehicle.

The PTO may comprise an output shaft with an output shaft gear portion. The output shaft gear portion may be drivingly and/or meshingly engaged or configured to be drivingly and/or meshingly engaged with a first drive shaft gear portion of a first drive shaft. A gear portion of a shaft may include a gear disposed on the respective shaft for torque transmission to the respective shaft. The first drive shaft gear portion and the output shaft gear portion may be disposed in the first chamber. The first drive shaft and/or the output shaft may be partially accommodated in the first chamber. The first drive shaft may extend through a wall portion separating or fluidically separating the first chamber from the second chamber. The output shaft may at least partially extend through a wall portion separating or fluidically separating the first chamber from the second chamber. The output shaft and/or the first drive shaft may extend substantially perpendicular to the axle shaft. The proposed arrangement and connection of the various shafts within the two chambers each reduces the required installation space while ensuring the most efficient cooling effect possible. Furthermore, the at least one passive heat conducting element may extend substantially parallel to the axle shaft. This allows an improved cooling effect to be achieved within minimal installation space. For example, a plate portion of the heat conducting body may extend substantially parallel to the axle shaft.

The first chamber may comprise a sump portion substantially arranged below and/or in a projection plane of the first drive shaft gear portion and the output shaft gear portion in the direction of gravity. In other words, the first chamber may comprise an additional chamber volume provided below the respective gear portions, which may provide an additional cooling reservoir. This allows, for example, a reservoir of coolant or cooling reservoir in general to be provided at or adjacent a location where the most heat is generated during operation of the PTO. The width of the sump portion measured along an extension direction of the first drive shaft and/or the output shaft may be substantially equal to or greater than the correspondingly measured width of the first drive shaft gear portion and/or the output shaft gear portion. The at least one passive heat conducting element may be partially disposed in the sump portion of the first chamber. This further improves the heat transfer.

Several embodiments have been disclosed herein. From the following detailed description, which shows and describes an exemplary embodiment of the present disclosure, further embodiments of the present disclosure will become apparent to the person skilled in the art. Accordingly, the figures and the detailed description are to be regarded as exemplary and not restrictive. Recurring features are marked with the same reference signs in the description of the accompanying figures in which

DETAILED DESCRIPTION

Figure 1:
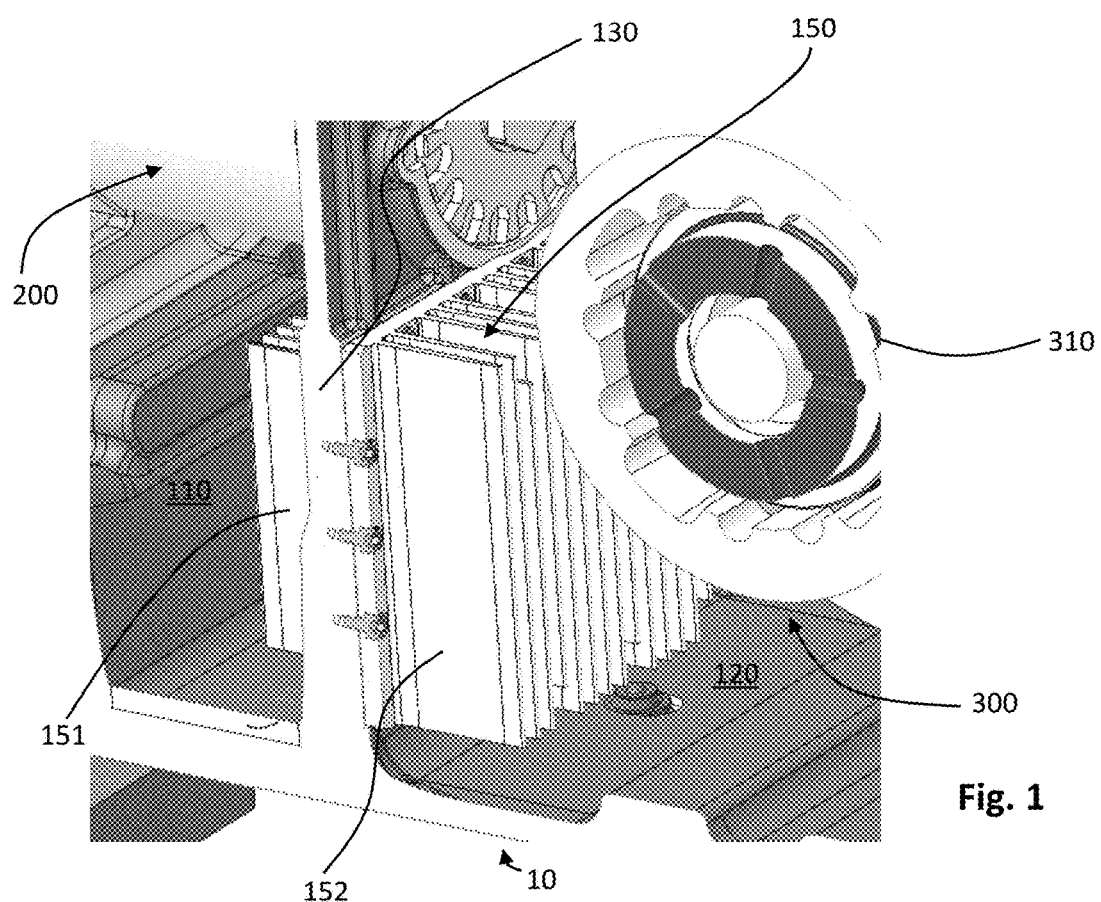
FIG. 1 shows a perspective sectional view of a cooling system according to an embodiment of the present disclosure.
Figure 2:
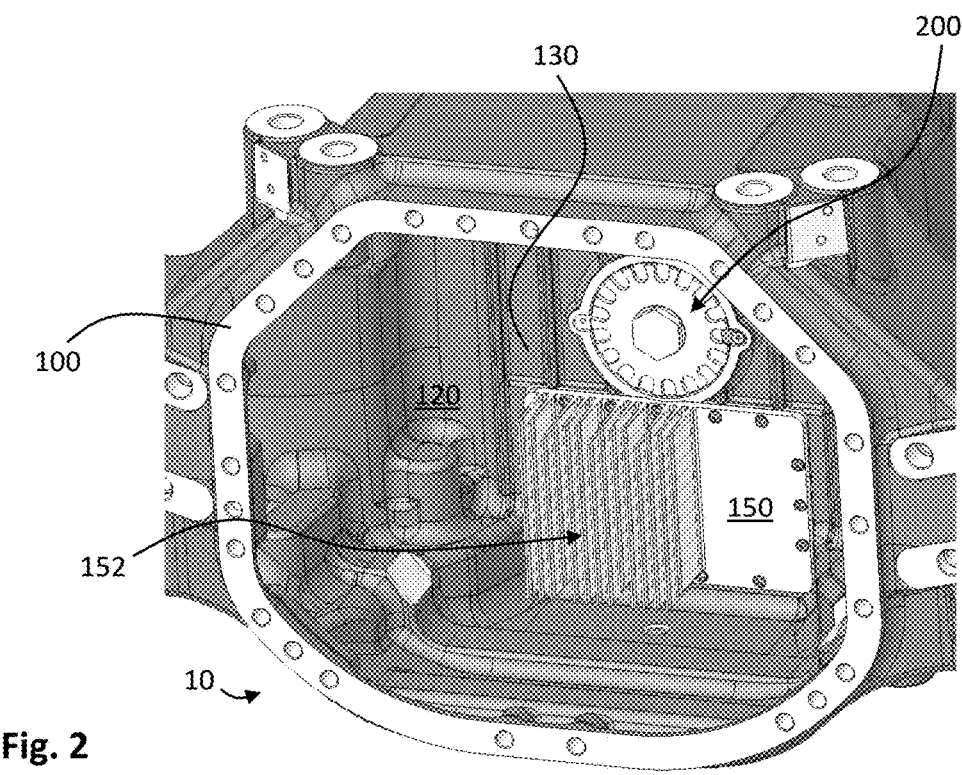
FIG. 2 shows another perspective view of the cooling system of FIG. 1.
Figure 3:
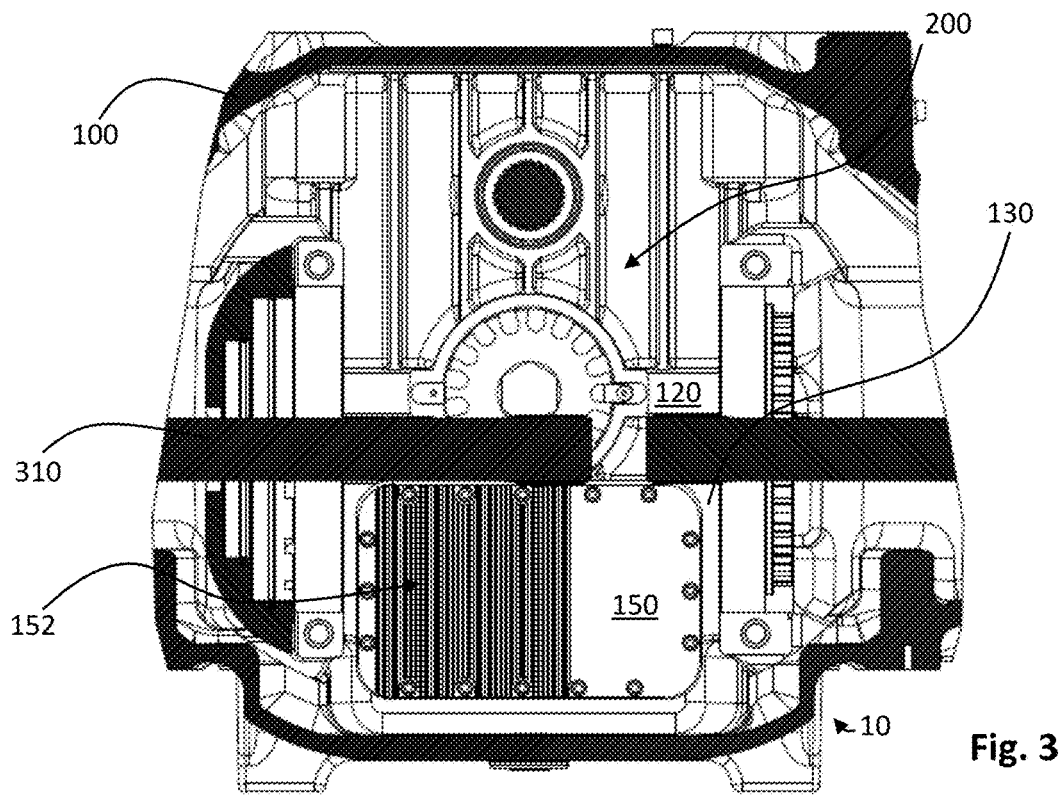
FIG. 3 shows a sectional view of the cooling system of FIG. 1.

FIGS. 1 to 8 show a possible embodiment of a cooling system according to the present disclosure in a detailed view or of the cooling system integrated in a transmission assembly. FIGS. 1 to 7 are drawn to scale. In the following, recurring features are described once for all Figures. In the case of additional or alternative features, reference is made to the corresponding Figure where appropriate.

The cooling system 10 for a PTO 200 comprises a housing 100 including a first chamber 110 for at least partially accommodating a PTO 200, a second chamber 120 for at least partially accommodating an axle assembly 300 including an axle shaft 310 and at least one passive heat conducting element 150 arranged between the first chamber 110 and the second chamber 120. The passive heat conducting element 150 is configured to provide thermal communication between the first chamber 110 and the second chamber 120.

The first chamber 110 is located adjacent to the second chamber 120. The first chamber 110 and the second chamber 120 are separated by a wall portion 130 of the housing 100. The wall portion 130 is arranged between the first chamber 110 and the second chamber 120. Consequently, the passive heat conducting element 150 is configured to provide thermal communication between the first chamber 110 and the second chamber 120 in addition to the wall portion 130 separating the first chamber 110 from the second chamber 120.

The first chamber 110 and the second chamber 120 may be filled or at least partially filled with a cooling liquid. The first chamber 110 and the second chamber 120 may be fluidically isolated from each other. The wall portion 130 of the housing 100 separating the first chamber 110 from the second chamber 120 may fluidically separate the first chamber 110 from the second chamber 120. The cooling liquid may comprise oil, for example cooling and/or lubricating oil. The first chamber 110 and the cooling liquid contained in the first chamber 110 may define a closed thermodynamic system.

The passive heat conducting element 150 comprises a heat conducting body partially disposed in the first chamber 110 and attached to the wall portion 130 separating or fluidically separating the first chamber 110 from the second chamber 120. Additionally, the passive heat conducing element 150 comprises a heat conducting body partially disposed in the second chamber 120 and attached to the wall portion 130. The heat conducting body may be sealingly attached to the wall portion 130. The heat conducting body extends into the first chamber 110 and into the second chamber 120. The heat conducting body comprises a first set of fins or ribs 151 extending into the first chamber 110 and a second set of fins or ribs 152 extending into the second chamber 120. The heat conducting body comprises a plate portion 153 attached to the wall portion 130. The heat conducting body extends through the wall portion 130. That is, the wall portion 130 has a through opening at the installation location of the passive heat conducting element 150 through which the heat conducting body extends. Alternatively, the passive heat conducting element 150 may be attached to a continuous section of the wall portion 130 separating or fluidically separating the first chamber 100 from the second chamber 120, where no through opening is provided. The plate portion 153 of the heat conducting body is attached to the wall portion 130 by fastening means on the side of the second chamber 120, such as screws, bolts, etc., which provides the bigger installation space with respect to the first chamber 110.

The passive heat conducting element 150 may be made of or comprise copper and/or aluminium. The passive heat conducting element 150 may be made of or comprise a material having a thermal conductivity of at least 30 W/(m·K), of at least 100 W/(m·K), or of at least 180 W/(m·K). The passive heat conducting element 150 may be made of a different material than the housing 100. For example, the housing 100 may be made of cast iron. For instance, the passive heat conducting element 150 may have a higher thermal conductivity than the housing 100.

Figure 4:
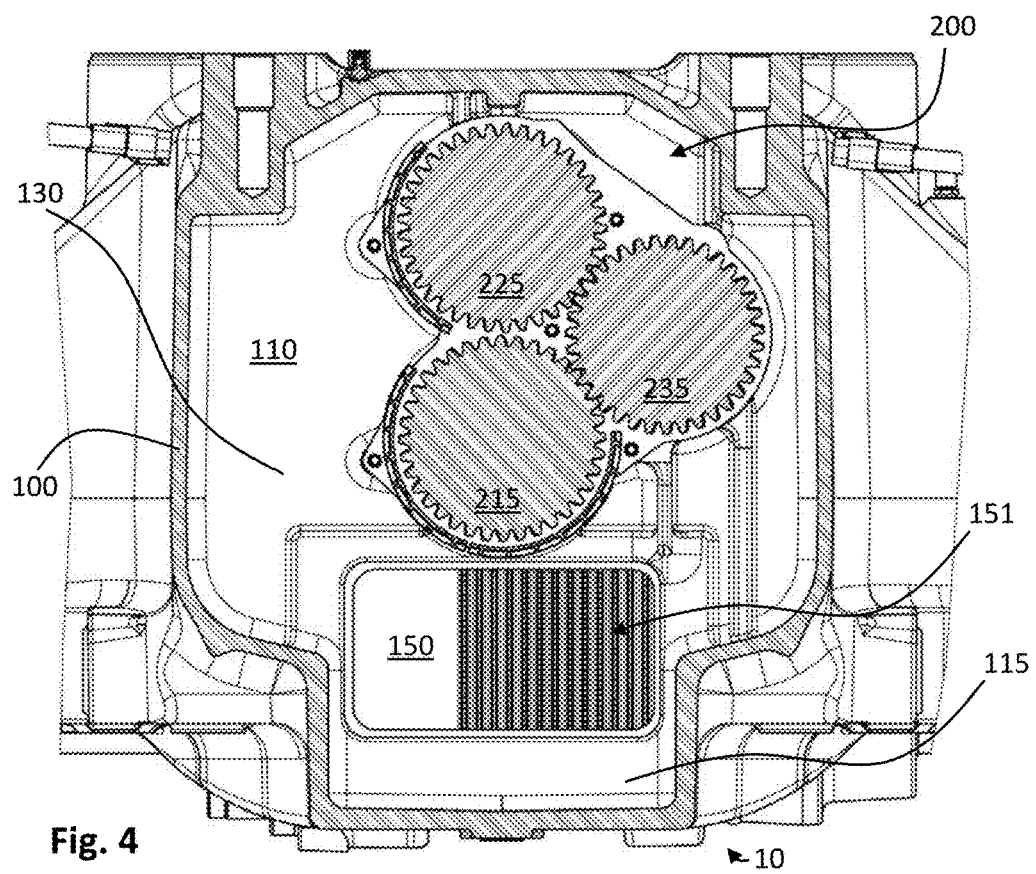
FIG. 4 shows another sectional view of the cooling system of FIG. 1.
Figure 5:
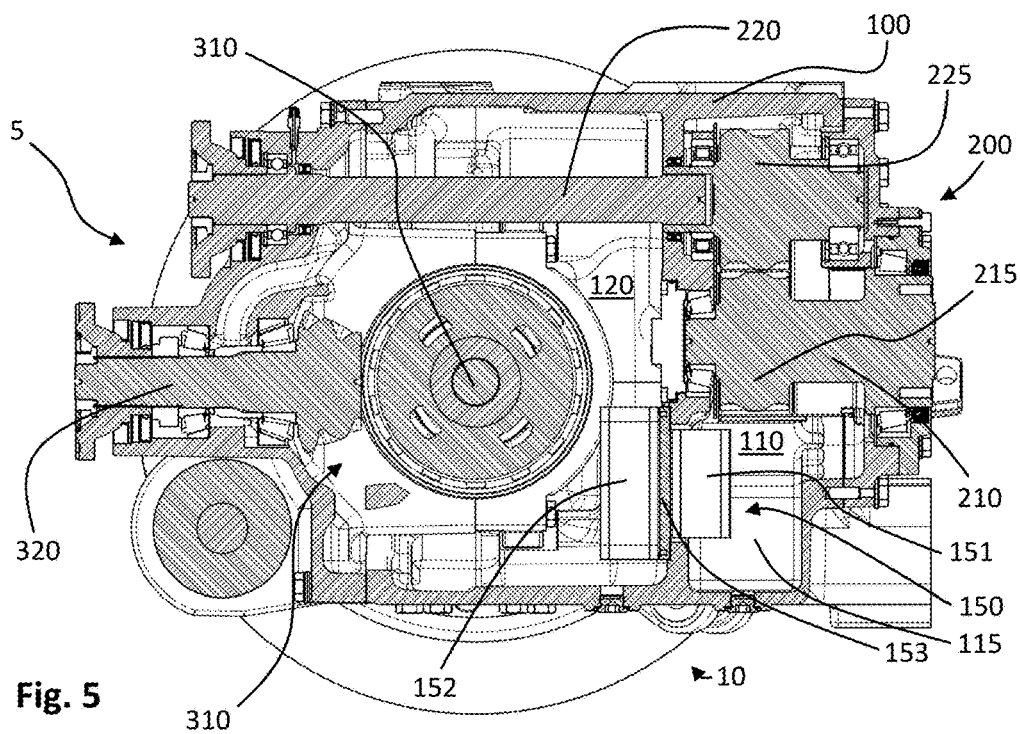
FIG. 5 shows a first sectional view of a transmission assembly including the cooling system of FIG. 1.
Figure 6:
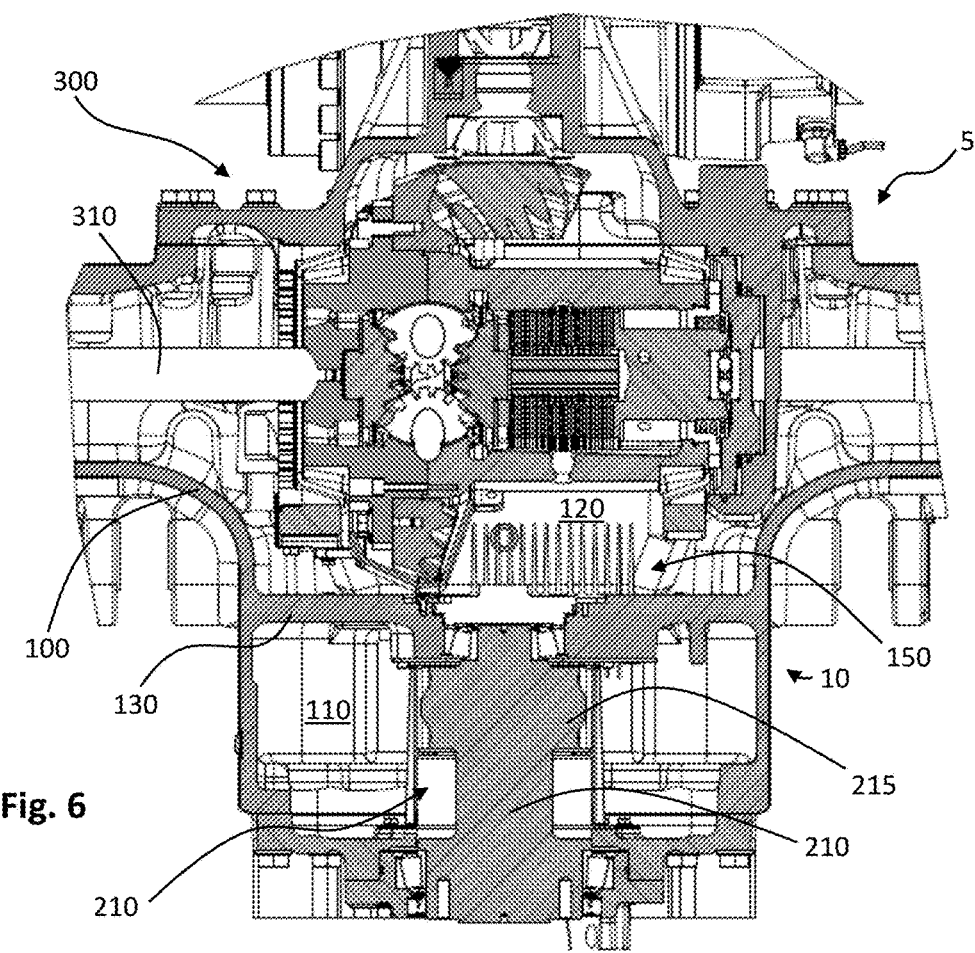
FIG. 6 shows a second sectional view of the transmission assembly of FIG. 5 including the cooling system of FIG. 1.
Figure 7:
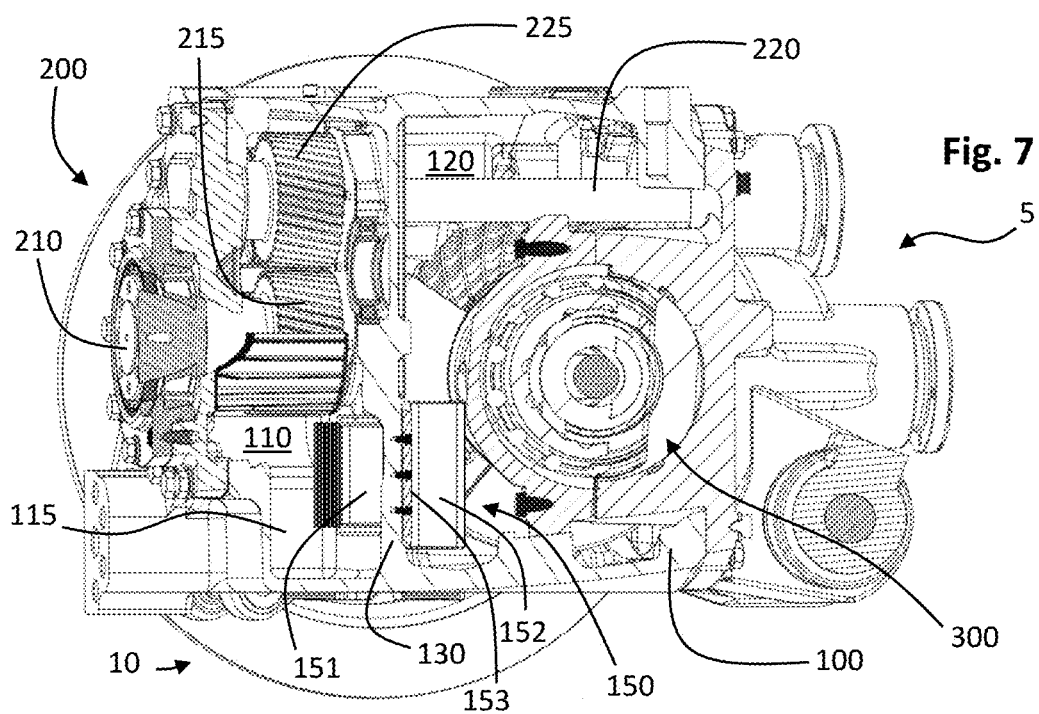
FIG. 7 shows a perspective view of the transmission assembly of FIG. 5 including the cooling system of FIG. 1.

FIGS. 5 to 7 show a transmission assembly 5 for a vehicle, the transmission assembly 5 comprising the cooling system of FIGS. 1 to 4, a PTO 200 at least partially arranged in the first chamber 110 and an axle assembly 300 including an axle shaft 310, wherein the axle assembly 300 is at least partially arranged in the second chamber 120.

The PTO 200 is drivingly engaged or configured to be drivingly engaged with a first drive shaft 220 and the axle shaft 310 is drivingly engaged or configured to be drivingly engaged with a second drive shaft 320. The axle shaft 310, the first drive shaft 220 and the second drive shaft 320 are at least partially accommodated in the second chamber 120. The axle assembly 300 comprises an axle differential connecting the second drive shaft 320 to two axle half-shafts of the axle shaft 310. The axle differential is at least partially accommodated in the second chamber 120. The axle shaft 310 may be provided for front or rear wheels of the vehicle.

The PTO 200 comprises an output shaft 210 with an output shaft gear portion 215. The output shaft gear portion 215 is drivingly engaged with a first drive shaft gear portion 225 of the first drive shaft 220. The first drive shaft gear portion 225 and the output shaft gear portion 215 each include a gear disposed on the respective shaft for torque transmission to the respective shaft. According to FIG. 4, the gear of the output shaft gear portion 225 is drivingly engaged with the gear of the first drive shaft gear portion 225 via an intermediate gear 235. Optionally, additional intermediate gears may also be provided. Alternatively, the output shaft gear portion 215 may be meshingly engaged with the first drive shaft gear portion 225. The first drive shaft gear portion 225 and the output shaft gear portion 215 are disposed in the first chamber 110. The first drive shaft 220 and the output shaft 210 are partially accommodated in the first chamber 110. The first drive shaft 220 extends through the wall portion 130 separating or fluidically separating the first chamber 110 from the second chamber 120. The output shaft 210 partially extends through the wall portion 130. The first drive shaft 220 and the output shaft 210 are rotatably mounted in the wall portion 130. The output shaft 210 and the first drive shaft 220 extend perpendicular to the axle shaft 310. The heat conducting element 150 extends parallel to the axle shaft 310. For example, the plate portion 153 of the heat conducting body extends parallel to the axle shaft 310.

As best shown in FIGS. 4, 5 and 7, the first chamber 110 comprises a sump portion 115 substantially arranged below and in a projection plane of the first drive shaft gear portion 225 and the output shaft gear portion 215. The width of the sump portion 115 measured along an extension direction of the first drive shaft 220 and the output shaft 210 is substantially equal to the correspondingly measured width of the first drive shaft gear portion 225 and the output shaft gear portion 215. The passive heat conducting element 150 is partially disposed in the sump portion 115 of the first chamber 110.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 1-7 are drawn with the components shown relative to gravity being vertically downward in the figures.

Figure 8:
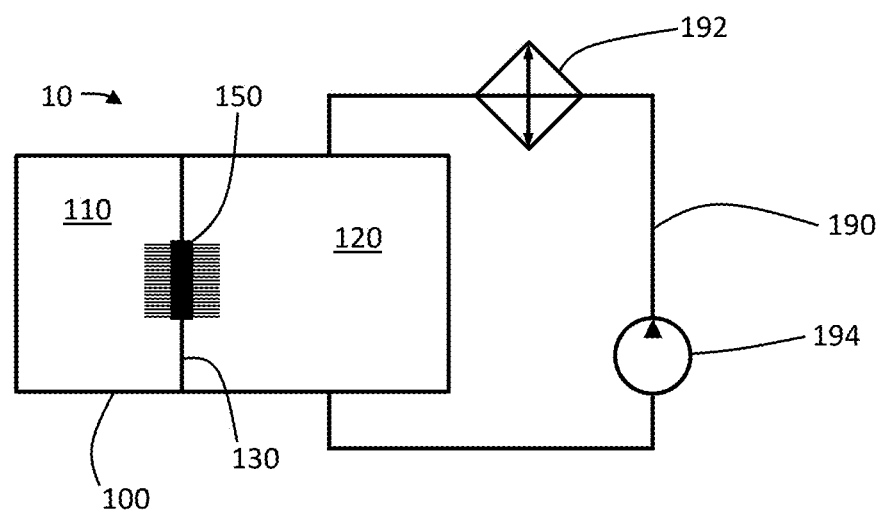
FIG. 8 shows a schematic view of the cooling system of FIG. 1 additionally including the optional feature of a cooling circuit.

According to FIG. 8, the cooling system 10 may optionally include a cooling circuit 190 comprising the second chamber 120 and a cooling liquid contained in the second chamber 120. For example, the second chamber 120 at least partially accommodating the axle assembly 300 may be connected or connectable to an existing cooling circuit, for instance the motor cooling circuit of the vehicle. The cooling circuit 190 comprises a heat exchanger 192 and a liquid pump 194 for circulating the cooling liquid between the second chamber 120 and the heat exchanger 192, while the cooling of the first chamber 110 remains exclusively passive.

The invention claimed is:

1. A cooling system for a power take-off, comprising:
a housing including a first chamber for at least partially accommodating a power take-off and a second chamber for at least partially accommodating an axle assembly including an axle shaft, and
at least one passive heat conducting element arranged between the first chamber and the second chamber, the at least one passive heat conducting element configured to provide thermal communication between the first chamber and the second chamber.

2. The cooling system of claim 1, wherein the first chamber and the second chamber are filled or at least partially filled with a cooling liquid and wherein the first chamber and the second chamber are fluidically isolated from each other.

3. The cooling system of claim 2, wherein the first chamber and the cooling liquid contained in the first chamber define a closed thermodynamic system.

4. The cooling system of claim 2, including a cooling circuit comprising the second chamber and the cooling liquid contained in the second chamber.

5. The cooling system of claim 4, wherein the cooling circuit further comprises a heat exchanger and a liquid pump for circulating the cooling liquid between the second chamber and the heat exchanger.

6. The cooling system of claim 1, wherein the at least one passive heat conducting element comprises a heat conducting body at least partially disposed in the first chamber and attached to or at least partially forming a wall portion separating or fluidically separating the first chamber from the second chamber.

7. The cooling system of claim 1, wherein the at least one passive heat conducting element comprises a heat conducting body at least partially disposed in the second chamber and attached to or at least partially forming a wall portion separating or fluidically separating the first chamber from the second chamber.

8. The cooling system of claim 6, wherein the heat conducting body comprises a plurality of fins or ribs extending into the first chamber and/or into the second chamber.

9. The cooling system of claim 6, wherein the heat conducting body comprises a plate portion attached to a wall portion separating or fluidically separating the first chamber from the second chamber.

10. The cooling system of claim 6, wherein the heat conducting body at least partially extends through a wall portion separating or fluidically separating the first chamber from the second chamber.

11. The cooling system of claim 1, wherein the at least one passive heat conducting element is made of or comprises copper and/or aluminium.

12. The cooling system of claim 1, wherein the at least one passive heat conducting element is made of or comprises a material having a thermal conductivity of at least 30 W/(m·K), of at least 100 W/(m·K), or of at least 180 W/(m·K).

13. A transmission assembly for a vehicle, the transmission assembly comprising the cooling system of claim 1, a power take-off at least partially arranged in the first chamber and an axle assembly including an axle shaft, wherein the axle assembly is at least partially arranged in the second chamber.

14. The transmission assembly of claim 13, wherein the power take-off is drivingly engaged or configured to be drivingly engaged with a first drive shaft and the axle shaft is drivingly engaged or configured to be drivingly engaged with a second drive shaft.

15. The transmission assembly of claim 13, wherein the power take-off comprises an output shaft with an output shaft gear portion, wherein the output shaft gear portion is drivingly and/or meshingly engaged or configured to be drivingly and/or meshingly engaged with a first drive shaft gear portion of a first drive shaft, and wherein the first drive shaft gear portion and the output shaft gear portion are disposed in the first chamber.

16. The transmission assembly of claim 15, wherein the first chamber comprises a sump portion substantially arranged below and/or in a projection plane of the first drive shaft gear portion and the output shaft gear portion in the direction of gravity.

17. The transmission assembly of claim 16, wherein the at least one passive heat conducting element is partially disposed in the sump portion of the first chamber.

18. The transmission assembly of claim 15, wherein the output shaft and/or the first drive shaft extend substantially perpendicular to the axle shaft.

19. The transmission assembly of claim 13, wherein the at least one passive heat conducting element, optionally a plate portion of the at least one passive heat conducting element, extends substantially parallel to the axle shaft.

* * * * *